(12) United States Patent  
Neuberger et al.

(10) Patent No.: US 11,587,271 B2  
(45) Date of Patent: Feb. 21, 2023

(54) CATALOG NORMALIZATION AND SEGMENTATION FOR FASHION IMAGES

(71) Applicant: Amazon Technologies, Inc., Seattle, WA (US)

(72) Inventors: Assaf Neuberger, Ness Ziona (IL); Alexander Lorbert, Givat Shmuel (IL); Arik Poznanski, Herzliya (IL); Eduard Oks, Redmond, WA (US); Sharon Alpert, Rehovot (IL); Bar Hilleli, Holon (IL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/008,964

(22) Filed: Sep. 1, 2020

(65) Prior Publication Data  
US 2022/0067994 A1 Mar. 3, 2022

(51) Int. Cl.  
G06T 5/50 (2006.01)  
G06T 11/60 (2006.01)  
(Continued)

(52) U.S. Cl.  
CPC ............ *G06T 11/60* (2013.01); *G06K 9/6256* (2013.01); *G06T 5/005* (2013.01); *G06T 5/50* (2013.01);  
(Continued)

(58) Field of Classification Search  
CPC . G06T 11/60; G06T 5/005; G06T 5/50; G06T 7/002; G06T 11/001; G06T 2207/30124; G06T 2207/30168; G06T 2207/20084; G06N 3/02; G06V 40/10; G06K 9/6256  
See application file for complete search history.

(56) References Cited

U.S. PATENT DOCUMENTS

2018/0047192 A1* 2/2018 Kristal ............... G06Q 30/0643  
2019/0043269 A1* 2/2019 Lin ............................ G06T 7/62  
(Continued)

FOREIGN PATENT DOCUMENTS

JP 5293636 6/2013

OTHER PUBLICATIONS

A. Siarohin, E. Sangineto, S. Lathuilière and N. Sebe, "Deformable GANs for Pose-Based Human Image Generation," 2018 IEEE/CVF Conference on Computer Vision and Pattern Recognition, 2018, pp. 3408-3416. (Year: 2018).*

(Continued)

*Primary Examiner* — Antonio A Caschera  
(74) *Attorney, Agent, or Firm* — K&L Gates LLP

(57) ABSTRACT

First image data representing a first human wearing a first article of clothing may be received. The first image data, when rendered on a display, may include a first photometric artifact. A first generator network may be used to generate second image data from the first image data. The first photometric artifact may be removed from the second image data. A second generator network may be used to generate third image data from the second image data, the third image data representing the first human in a different pose relative to the first image data. Fourth image data representing the first article of clothing segmented from the first human may be generated and displayed on a display.

20 Claims, 7 Drawing Sheets

(51) Int. Cl.
| | |
|---|---|
| *G06V 40/10* | (2022.01) |
| *G06K 9/62* | (2022.01) |
| *G06T 5/00* | (2006.01) |
| *G06T 7/00* | (2017.01) |
| *G06T 11/00* | (2006.01) |

(52) U.S. Cl.
CPC .......... *G06T 7/0002* (2013.01); *G06T 11/001* (2013.01); *G06V 40/10* (2022.01); *G06T 2207/30124* (2013.01); *G06T 2207/30168* (2013.01)

(56) References Cited

U.S. PATENT DOCUMENTS

2019/0286950 A1  9/2019  Kiapour et al.
2021/0272341 A1* 9/2021  Swaminathan ...... G06K 9/6256

OTHER PUBLICATIONS

B. Ding, C. Long, L. Zhang and C. Xiao, "ARGAN: Attentive Recurrent Generative Adversarial Network for Shadow Detection and Removal," 2019 IEEE/CVF International Conference on Computer Vision (ICCV), 2019, pp. 10212-10221. (Year: 2019).*

Hsieh et al.; FashionOn: Semantic-guided Image-based Virtual Try-on with Detailed Human and Clothing Information; Proceedings of the 28$^{th}$ ACM Joint Meeting on European Software Engineering Conference and Symposium on the Foundations of Software Engineering; Oct. 15, 2019; pp. 275-283; ACM; New York, NY.

Pan et al.; Loss Functions of Generative Adversarial Networks (GANs): Opportunities and Challenges; IEEE Transacations on Emerging Topics in Computational Intelligence; Aug. 2020; 24 pgs; vol. 4; No. 4.

Kunnen; International Search Report and Written Opinion of PCT/US2021/047340; dated Jan. 5, 2022; 11 pgs.

Computer-Generated Translation of JP5293636 retrieved from https://www.j-platpat.inpit.go.jp/h0101 on May 4, 2020; 36 pgs.

Hsieh et al.; FashionOn: Semantic-guided Image-based Virtual Try-on with Detailed Human and Clothing Information; Proceedings of the 27th ACM International Conference on Multimedia; Oct. 15, 2019; pp. 275-283; Nice, France.

Pan et al.; Loss Functions of Generative Adversarial Networks (GANs): Opportunities and Challenges; IEEE Transactions on Emerging Topics in Computational Intelligence; May 21, 2020, pp. 500-522; vol. 4; No. 4.

Kuhnen; International Search Report and Written Opinion of PCT/US2021/047340; dated Jan. 5, 2022; 15 pgs.

* cited by examiner

CATALOG NORMALIZATION AND SEGMENTATION FOR FASHION IMAGES

BACKGROUND

Fashion images may include models wearing clothing or may include images of the clothing on hangers and/or folded and displayed on a surface. Some e-commerce sites and services provide fashion products from numerous different sellers. However, the images of the fashion products of the different sellers are not uniform and may not meet catalogue specifications. For example, images may have different and/or suboptimal lighting, models may use different poses, there may be photometric artifacts such as from lens flare, there may be low contrast, non-balanced whites, and a host of other issues concerning the quality of the images. Professional photo editors are often employed to edit fashion images into "packshot" photos that display the fashion item in an arrangement that simulates the fashion item being worn by a human.

DETAILED DESCRIPTION

Figure 1:
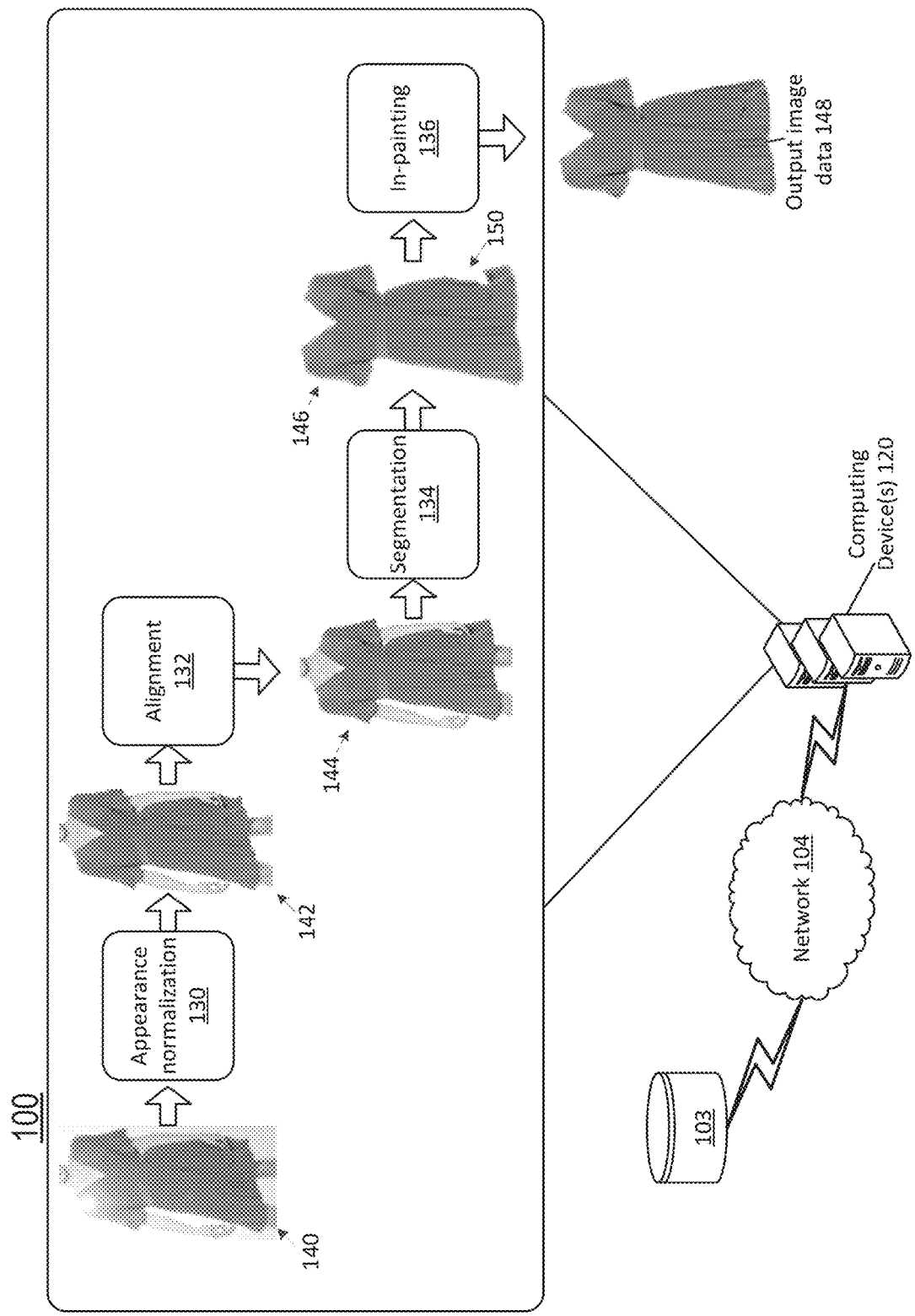
FIG. 1 is a diagram of an example system configured to perform catalog normalization and segmentation for fashion images, according to various embodiments of the present disclosure.

In the following description, reference is made to the accompanying drawings that illustrate several example embodiments of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Online fashion catalogs typically display photographs with garments (articles of clothing) that are either worn by human models or not. Photographs of garments that are not worn by models, but which simulate the volume of the human body without draping the article of clothing on a human model or dress form, are sometimes referred to as "packshots." The images of garments in catalogs (and particularly in online catalogs where the images are sometimes provided by different third party sellers) can be of varying photographic quality. Packshot photographs have traditionally been created by professional companies that use specialized software and highly-skilled photographers and/or photo editors to create such photos. In online fashion marketplaces, different sellers may provide variable quality photographic images. In such environments, some third parties and private sellers may not provide photographs that meet requirements of the online marketplace in terms of photograph capturing distance, angle, illumination, and/or other quality-related photographic specifications.

Described herein are various techniques used for catalog normalization and/or human body segmentation for fashion images that can automatically generate high quality packshot images from input image data. In various examples, machine learning-based systems and techniques are described that receive a fashion image (e.g., an image of a model wearing an article of clothing) as input and normalize the image according to a pre-specified fashion catalog standard/specification. In various examples, semantic segmentation is used to edit out the human model wearing the article of clothing. Additionally, various other machine learning techniques described in further detail below are used to improve the quality of the fashion images by standardizing the pose of the model (and thus the garment worn by the model), removing photometric artifacts (e.g., editing the image to generate an edited version in which photometric artifacts such as lens flare, poor contrast, etc., are removed), removing occlusions of the fashion item (e.g., occluded/obscured portions of the fashion item due to the models hair, arms, legs, hands, accessories, etc.), and generally automating the process of creating a packshot image from an input image of a model wearing an article of clothing. Generating a packshot image by a photo-editor is a technically difficult task that traditionally requires dedicated, skilled professionals. The techniques described herein may enable online fashion sellers and/or catalogers to meet fashion catalog requirements in an automated fashion.

Segmentation of image data includes separation of pixels determined to pertain to one part of an environment from pixels determined to pertain to another part of the environment. For example, a person standing in the foreground of an image may be segmented from the background environment or an article of clothing being held may be segmented from the person holding the article using segmentation techniques. Segmentation techniques may generate segmentation masks that denote whether each pixel of an image is a part of the "foreground" or the "background," or that denote a segmentation class for each pixel. Additionally, convolutional neural networks and/or other machine learning models can be used to classify types and/or classes of objects. For example, a convolutional neural network may be used to detect and classify objects present in segmented foreground image data and/or background image data corresponding to a class for which the convolutional neural network (CNN) has been trained.

In various examples, generative adversarial networks (GANs) may be trained using the various techniques described herein to generate synthetic image data (e.g., an image of a model wearing a garment). In GANs, a generator is trained to generate synthetic image data based on input data (e.g., based on a vector input and/or input image data). The generator is trained to map data from a latent space to a particular data distribution of interest. A discriminator is used to discriminate between images from the true distribution (e.g., from natural image data captured using a camera device) and synthetic image data produced by the generator. Training instances may include ground truth data indicating whether the image is "real" (e.g., natural) or "fake" (e.g., synthetically generated). The training goal of the generator is to increase the error rate of the discriminator (e.g., to generate synthetic image data that appears to be of the true distribution). Back propagation is used in both the generator and the discriminator networks so that the quality of synthetic image data produced by the generator is increased while the discriminator network becomes better at distinguishing between true data and synthetic data produced by the generator. In various examples, the generator may be a deconvolutional neural network and the discriminator may be a CNN.

As described herein, synthetic or "fake" data may refer to data generated by a generator of a GAN. Conversely, data input to a trained generator for transformation (e.g., for removal of photometric artifacts and/or for pose alignment) may be referred to herein as "real" or "natural" image data (e.g., input RGB image data). However, in some examples described herein, a first generator of a first GAN may output synthetic image data that may subsequently be input into a second generator of a second GAN. The terms "synthetic" and "fake" may be used interchangeably in this context.

Machine learning techniques, such as those described herein, are often used to form predictions, solve problems, recognize objects in image data for classification, etc. For example, herein machine learning techniques may be used to determine substitute items for a given item. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Generally, in machine learning, an embedding is a mapping of a discrete, categorical variable to a vector of continuous numbers. In neural networks, embeddings are typically of lower dimensions relative to the data that the embeddings represent. In various examples, token embeddings may be generated to represent various text (e.g., review snippets) described herein for input into the various machine learning models described herein.

FIG. 1 is a diagram of an example system 100 configured to perform catalog normalization and segmentation for fashion images, according to various embodiments of the present disclosure. As depicted in FIG. 1, computing device(s) 120 may include a non-transitory computer-readable memory 103 and/or may be configured in communication with non-transitory computer-readable memory 103, such as over network 104. In some examples, non-transitory computer-readable memory 103 may store instructions that, when executed by at least one processor of computing device(s) 120, may be effective to perform one or more of the various techniques described herein. In various examples, network 104 may represent a local area network (LAN) and/or a wide area network (WAN) such as the internet. Computing device (s) 120 may receive input image data 140 representing a human wearing at least one article of clothing. In various examples, the first image data may include at least one photometric artifact. As used herein, "photometric artifacts" describe irregularities in input photographs such as low contrast, image noise, lens flare, shadows, non-balanced white colors, etc.

Input image data 140 may be input into an appearance normalization model 130. The appearance normalization model 130 may be a first generator network that may be trained as part of a first GAN. The appearance normalization model 130 may generate second image data 142. In various examples, the second image data 142 may resemble the input image data 140, but with the photometric artifacts removed to enhance image quality. Modification of input image data 140 to remove photometric artifacts may include normalization of the image data to resemble natural images used to train appearance normalization model 130 (as described in further detail below). For example, appearance normalization model 130 may improve contrast of input image data 140 to conform to a contrast distribution across training images including natural image data (e.g., image data that is not synthetically generated, but is instead captured by a camera). Modifying the contrast of an image may have other effects, such as altering the appearance of shadows which may, in turn, affect the way small variations in the appearance of the garment and/or human model may appear. For example, in FIG. 1, lens flare in the model's shoulder region has been removed to better show the garment.

Although not shown in FIG. 1, prior to input into alignment model 132, the second image data 142 may be subjected to a pose detection algorithm configured to determine anatomical landmarks of the input image. For example, a thin-plate-spline (TPS) geometric transformation model (e.g., a TPS transform) may be applied to perform a geometric transformation for each pixel in the second image data 142 to determine pose data. In various examples, a determination may be made that the pose data indicates that the model is posed in a pose that is misaligned with respect to a target aligned pose. After pose detection, the second image data 142 may be input into an alignment model 132. Alignment model 132 may be a second generator network trained as part of a second GAN. The alignment model 132 may align a figure (e.g., the model's pose) to conform to a canonical frontal pose (or other desired pose, depending on the implementation) and/or to generate a symmetrically aligned pose. In the example depicted in FIG. 1, the model's left shoulder is raised in second image data 142 prior to processing using alignment model 132. However, the model's shoulders have been aligned in third image data 144. The alignment model 132 is described in further detail below in reference to FIG. 3.

The third image data 144 including the depiction of the model in an aligned, frontal pose may be input into segmentation model 134. Segmentation model 134 may perform semantic image segmentation to generate a segmentation mask (not shown in FIG. 1). The segmentation mask may classify each pixel of the third image data 144 as belonging to a particular class. In an example implementation, each pixel determined to be part of the dress worn by the model in FIG. 1 may be labeled as "foreground" or with other data identifying the pixels representing the dress as pertaining to the same class. Similarly, pixels representing the model (e.g., the model's arms, legs, neck, etc.) may be labeled as "background" or with other data identifying such pixels as pertaining to the model. Similarly, pixels representing the background may be labeled as "background" or with other data identifying such pixels as pertaining to the image's background.

The segmentation mask may be applied to third image data 144 such that pixels that do not pertain to the relevant article of clothing (e.g., pixels in the segmentation mask that pertain to the model, the background, or to any other class apart from the dress) are "masked out" (sometimes referred to as being "segmented from" the image data). As used herein, "masked out" pixels may be set to a particular pixel value in order to segment the article of clothing from the image. For example, all non-dress pixels may be set to a bright white color or to a black color to show the dress removed from the model and/or from the background. Applying the segmentation mask to the third image data 144 generates fourth image data 146. In the example in FIG. 1, fourth image data 146 depicts the dress with the human model removed. However, there is an occlusion 150 in fourth image data 146 where the model's hand covered a portion of the dress.

The fourth image data 146 including any occlusions (e.g., occlusion 150 and/or other portions of the garment that are occluded from view) may be sent to an in-painting model 136. In-painting model 136 may identify the pixels representing the occlusion 150 and may generate pixel values for the occlusion 150 such that the occluded portion of the image is "filled in" to resemble the remainder of the article of clothing in a way that appears natural to the human eye. For example, in output image data 148, the occlusion 150 has been removed and has been replaced by pixel values that resemble other non-occluded portions of the dress. Output image data 148 may conform to relevant catalog standards. For example, output image data 148 may be a high quality packshot image that has been automatically generated by the system 100 without requiring manual editing by an expert photo-editor.

In various examples, one or more of the generator networks (e.g., trained using a GAN) described herein may be selectively enabled to generate image data representing the input fashion image, but that changes one or more aspects of the article of clothing depicted in the input image. For example, a generator network may be trained and enabled to change a color of the input garment image to a selected color. In another example, a generator network may be trained and enabled to change the style, texture, and/or other aspect of the input image so that the output image of the garment comprises one or more desired qualities.

Figure 2:
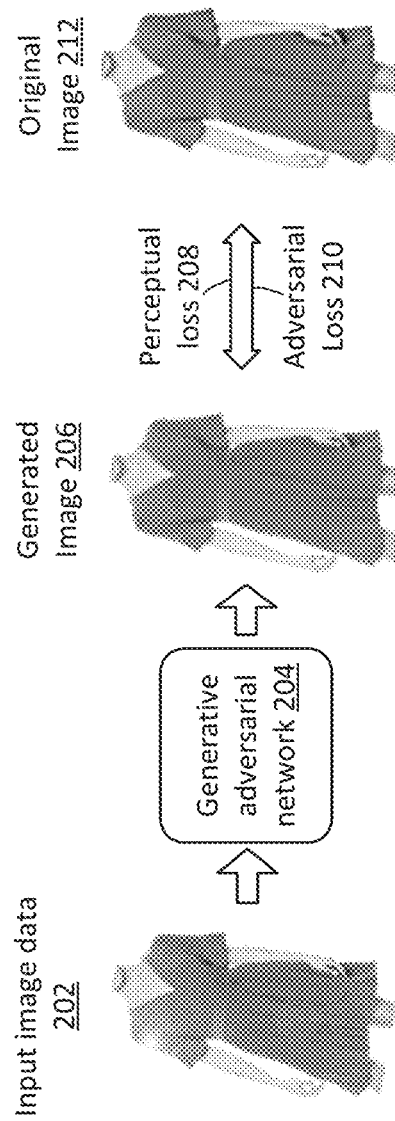
FIG. 2 illustrates an image normalization technique using a generative adversarial network, in accordance with various embodiments of the present disclosure.

FIG. 2 illustrates an image normalization technique using a generative adversarial network 204, in accordance with various embodiments of the present disclosure. Generative adversarial network 204 may be trained using perceptual loss 208 and adversarial loss 210 and may be used to generate the first generator network used in appearance normalization model 130 (FIG. 1).

The appearance normalization model 130 trained using generative adversarial network 204 may improve (and/or remove) photometric artifacts appearing in many low quality fashion images (e.g., third party images and/or private sellers of used clothing). The generative adversarial network 204 may be trained on a collection of fashion images that meet relevant catalog standards (in terms of quality). The fashion images from the training data may be artificially corrupted to generate input image data 202. For example, common photo acquisition nuisances/artifacts that occur in non-professional photos may be artificially introduced into the catalog images. Examples of such photometric artifacts may include low contrast images, noise, lens flare, shadows, non-balanced whites, etc. In other examples, instead of a training pair that includes a natural high quality image and an artificially corrupted version (with photometric artifacts) that corresponds to the natural high quality image, a low quality image (e.g., an image that includes one or more photometric artifacts) may be used. Such an image may be manually edited (e.g., by a human photo editor and/or by photo editing software) to remove the photometric artifact, in order to generate a pair of corresponding images for training (the pair comprising an image with one or more photometric artifacts and a corresponding image with the photometric artifacts removed). The input image data 202 may be input into the generator network of the generative adversarial network 204. During training the generator network generates high-quality images that are compared to the original high-quality images (e.g., prior to corruption) to determine perceptual loss 208 and to constrain image generation by the generator network based on the input images.

The neural network (generator) that generates the output image may be denoted as G, the original image as $I_t$ (e.g., original image 212), the corrupted image as $I_c$ (e.g., the input image data 202) and the generator prediction for the original image as $G(I_c)=\hat{I}_t$. Accordingly, $\hat{I}_t$ is the generated image 206. The generator may be trained using a reconstruction loss and an adversarial loss. The reconstruction loss function for the network is a combination of the perceptual VGG loss and L1 loss on between $I_t$ and $\hat{I}$: $loss_{rec}=\|I_t-\hat{I}_t\|_1+\Sigma_l\lambda_l\|\phi_l(I_t)-\phi_l(\hat{I}_t)\|_1$. An activation map $\phi_l$ is obtained from a pretrained VGG classification network layer 1. An adversarial loss 210 is also added in order to retain a natural appearance for the output image $\hat{I}_t$. This is achieved using a conditional GAN setup, where an additional convolutional network is defined as a discriminator that classifies an input as fake or real. In our case, the input to the discriminator is a pair of images ($I_c$, $I_t$) as real samples and ($I_c$, $\hat{I}_t$) as fake samples. The adversarial loss function is defined as:

$loss_{adv}=\log(D(I_c, I_t))+\log(1-D(I_c, G(I_c)))$ where the generator network attempts to minimize the loss, while the discriminator attempts to maximize it.

Figure 3:
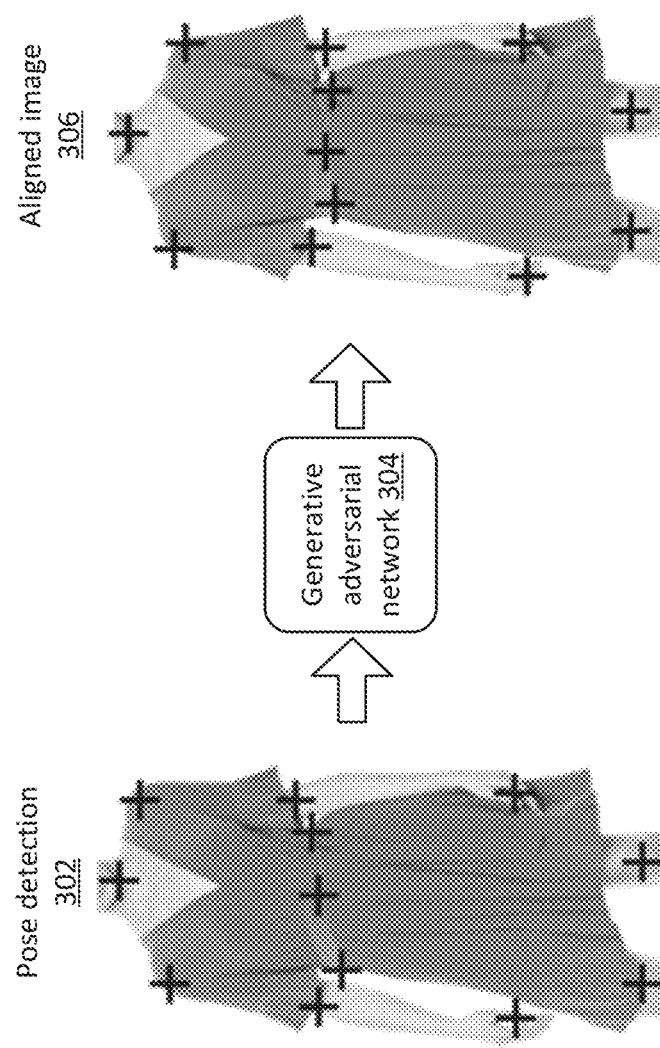
FIG. 3 illustrates pose alignment using another generative adversarial network, in accordance with various aspects of the present disclosure.

FIG. 3 illustrates pose alignment using a generative adversarial network 304, in accordance with various aspects of the present disclosure. Generative adversarial network 304 may be trained to generate the second generator network used in alignment model 132.

Alignment model 132 may receive a non-aligned image of a human model as an input and may align the pose of the model to a predetermined pose (e.g., a canonical frontal pose) in an output aligned image 306. Training is performed using pairs of images, where one image is a non-aligned instance of the same human model wearing the same garment (serving as the input to the generator network) and the other image $I_t$ is aligned and serves as the target for the generator network's output. In another example, training pairs of images may be generated by taking a natural aligned image and modifying the image to introduce an artificial misalignment. In some further examples, natural image pairs including an aligned image and a corresponding misaligned image may be used during training. In various examples, the different types of paired training images described above may be mixed to generate a training data corpus. Using a pose detection algorithm 302, the anatomical landmarks of the input image are detected. Appling a geometric transformation for each pixel in the image is done using a Thin-Plate-Spline (TPS) transform. Additionally, a contour of the human body may be generated using a segmentation algorithm. The generative adversarial network 304 takes as input the original catalog image I, landmarks p, and body contour b. The output of the network is the displacement parameters θ that relates to the landmarks p. These parameters θ are determined using a fully connected layer that predicts their value. Then, θ is applied to a TPS transform as control points and the output aligned image 306 is generated as $\hat{I}_t = T_\theta(I)$. The reconstruction loss function for the network is a combination of the perceptual VGG loss and L1 loss between $I_t$ and $\hat{I}$: $loss_{rec} = \|I_t - \hat{I}_t\|_1 + \Sigma_l \lambda_{l'} \|\phi_l(I_t) - \phi_l(\hat{I}_t)\|_1$. An activation map $\phi_l$ is obtained from a pretrained VGG classification network layer l. An adversarial loss may also be included in order to retain a natural appearance for the output image $\hat{I}_t$. This is achieved using a GAN setup, where an additional convolutional network is defined as a discriminator that classifies an input as fake or real. In some examples, the input to the discriminator is a pair of images $(I, I_t)$, as real samples, and $(I, \hat{I}_t)$ as fake samples. The adversarial loss function is defined as:

$loss_{adv} = \log(D(D(I, I_t)) + \log(1 - D(I, \hat{I}_t))$ where the generator network attempts to minimize the loss, while the discriminator attempts to maximize it.

Figure 4:
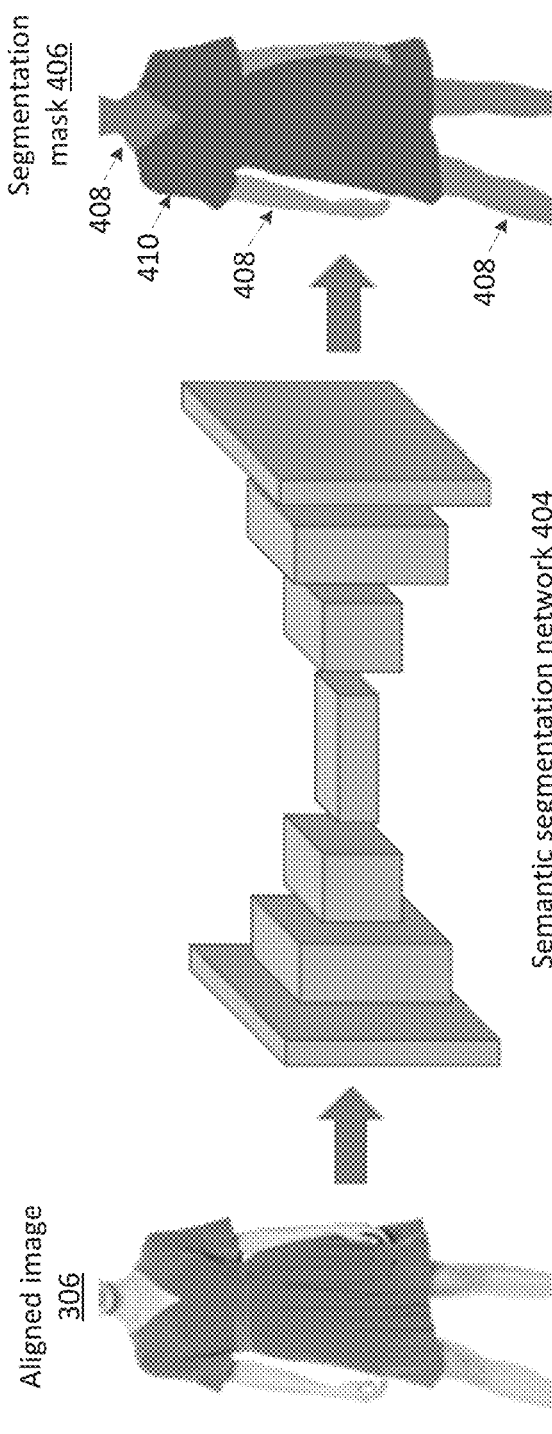
FIG. 4 illustrates generation of a segmentation mask using a semantic segmentation network, in accordance with various aspects of the present disclosure.

FIG. 4 illustrates generation of a segmentation mask using a semantic segmentation network 404, in accordance with various aspects of the present disclosure.

The semantic segmentation network 404 extracts the human figure parts from the image in order to generate a "garment-only" image using segmentation mask 406. After applying segmentation mask 406 to the input image (e.g., aligned image 306) the resulting image includes only those pixels that are classified as pertaining to the garment. The segmentation mask is a classification of the human body parts and fashion garments into labels that are predefined to the relevant domain (e.g., "tops," "left hand," "hair," "leg," etc.). The network architecture is a fully convolutional neural network that is trained for the task of semantic segmentation of fashion images. In various examples, feature maps may be extracted from a pre-trained network (e.g., the ResNet classification network). The feature maps may have smaller spatial size than the original input image, but may include many channels that capture high-level contextual information.

Afterwards, the feature map may be pooled using multi-sized sub-regions thus incorporating information from various scales. Then, this multi-scaled information is up-sampled to the original image spatial size, concatenated, and fed into a convolutional layer that outputs the label prediction for each pixel in the input image. In various examples, the semantic segmentation network 404 may be trained on fashion imagery using annotations for garments categories from the fashion domain and using a cross entropy loss function. In the example depicted in FIG. 4, the segmentation mask 406 output by semantic segmentation network 404 comprises first pixels 408 classified as pertaining to the model (e.g., pixels including label data indicating that the pixels belong to a first class), and second pixels 410 classified as pertaining to the subject article of clothing (e.g., pixels including label data indicating that the pixels belong to a second class).

In various examples, the image output by segmentation model 134 (e.g., implemented as semantic segmentation network 404 described in reference to FIG. 4) may have one or more occlusions. An occlusion is a portion of the subject garment that is not shown due to some other object being in front of, and occluding, the portion of the subject garment. Common occluding objects include the model's arms, hands, legs, hair, objects that the model is holding, furniture, etc. In various examples, in-painting techniques may be used to detect occlusions and to generate pixels to "fill in" the occlusion. The generated pixels may appear to be a natural part of the subject garment.

Generally, image in-painting is the task of completing missing parts of the image in a plausible way that appears natural to the human eye. Various image in-painting techniques may be used in accordance with the present disclosure. In various examples, certain in-painting techniques may work better in the fashion context. Image in-painting is the task of synthetic completion of missing parts in an image. Deep learning approaches for image in-painting enable an improved incorporation of semantics and can produce new patterns (e.g., patterns that are similar to the appearance of the subject garment), in comparison to classical patch-based approaches. Adversarial loss using GANs has been demonstrated for image in-painting, where simply using a L2 reconstruction loss yields a blurry completed image. A GAN may be trained using pairs of natural images and by injecting artificial occlusions into the images. A generator and discriminator may be jointly trained, where the generator renders the completed image from the context image, while the discriminator attempts to distinguish whether the rendered image is real or fake. In order to improve local fine texture in the completed image, a local patch-based discriminator may be added to the context discriminator. In some examples, a GAN may be trained to assess a prior for how natural an image looks. In various examples, the GAN may be trained together with a mask-based weighted L1 loss to determine a context of the input image. As an online optimization task, both the prior and the context losses are back propagated to determine the best latent GAN input vector for each input image.

Another deep learning loss that is used for image in-painting is the perceptual loss, where the activations of a pre-trained classification network are compared, as opposed to comparing only the RGB pixel values as in classic loss functions. This is similar to various implementations of the GANs described above in reference to FIGS. 2 and 3.

In various examples, a non-learnable partial convolution layer that omits missing pixel locations in the computation of the convolution operator, yet normalizes the output to compensate for the number of non-missing pixel locations in the computation may be used. In addition, perceptual loss and style loss (e.g., Gram matrix channel comparison of a pre-trained classification network activations) may be added to the L1 loss term. These losses may be computed for the holes (e.g., pixels that have been occluded) and the valid pixel locations.

In some other examples, attention-mechanisms may be used for image in-painting. In attention-based in-painting, a contextual attention layer uses the features of known patches as convolutional filters to process the generated patches. In some embodiments, a proposed attention-based network may comprise two stages. The first stage may generate a coarse output using a L1 reconstruction loss. The second stage may comprise two parallels pathways. The first pathway may generate new patches that are based on the existing patches of the contextual attention layer. In order to allow the network to generate novel content (e.g., "hallucinations"), a second pathway may process the coarse inputs using dilated convolutions.

The pathways may be aggregated and fed into a single decoder to obtain the final output that may be subjected to both local and global Wasserstein GAN-based losses. In some examples, the hard-gating of a partial convolution layer may be replaced with a learnable soft-gating mechanism for each channel and each spatial location. Using PatchGan loss and contextual attention layers, the proposed network handles free-from image in-painting (vs. rectangular holes in the aforementioned previous works).

Figure 5:
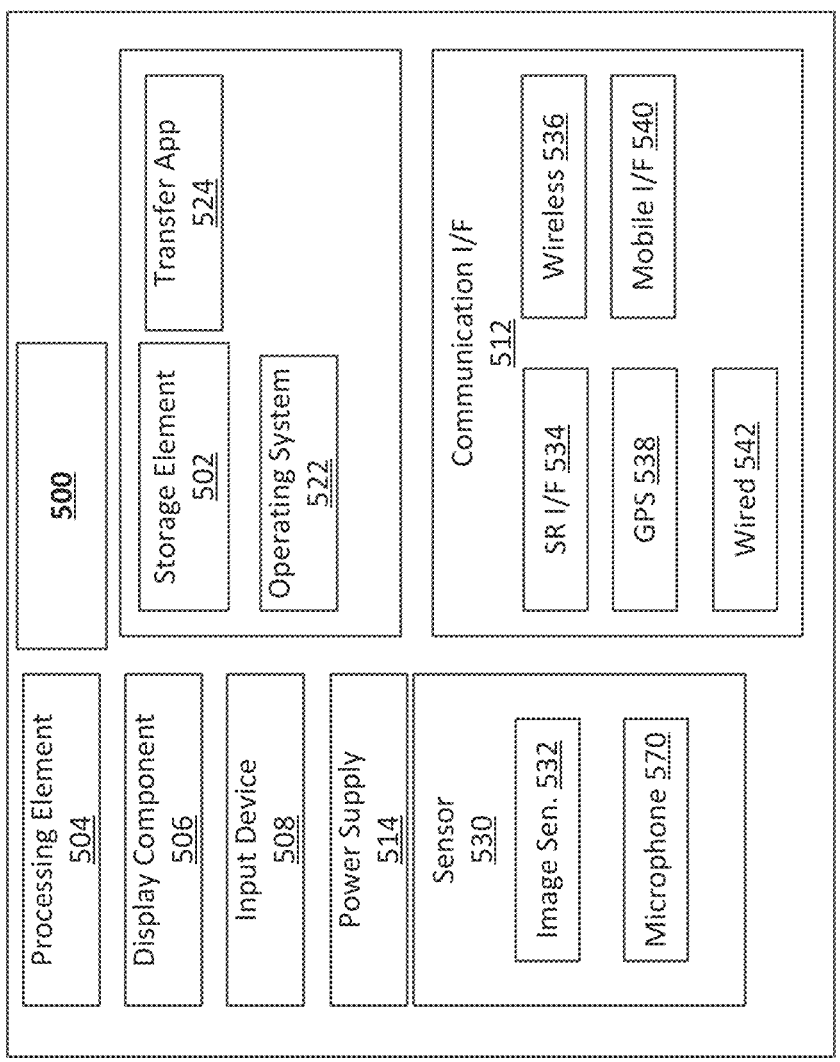
FIG. 5 is a block diagrams showing an example architecture of a computing device that may be used in accordance with various embodiments described herein.

FIG. 5 is a block diagram showing an example architecture 500 of a computing device that may be used in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store segmentation masks generated using the segmentation techniques described herein. In another example, storage element 502 may store one or more machine learning models (and/or parameters thereof) to The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images and/or segmentation masks generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing device(s) 120, as described herein, are exemplary, and may be located as a stand-alone device or may be included, in whole or in part, as a component of a larger device or system.

Figure 6:
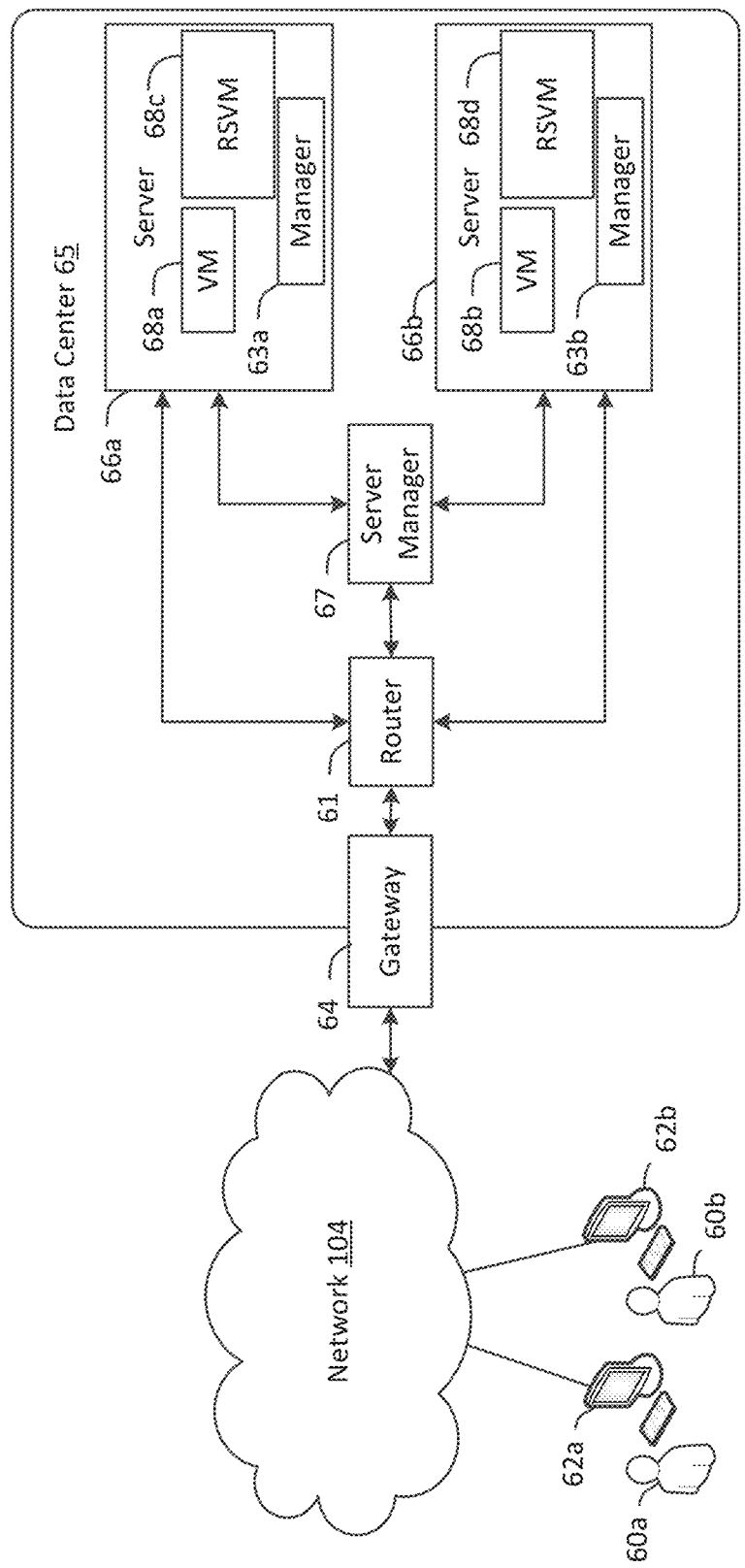
FIG. 6 is a diagram illustrating an example system for sending and providing data that may be used in accordance with the present disclosure.

An example system for sending and providing data that may be used to perform catalog normalization and segmentation for fashion images will now be described in detail. In particular, FIG. 6 illustrates an example computing environment in which the embodiments described herein may be implemented. For example, the computing environment of FIG. 6 may be configured to perform catalog normalization and segmentation for fashion images as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various image processing techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
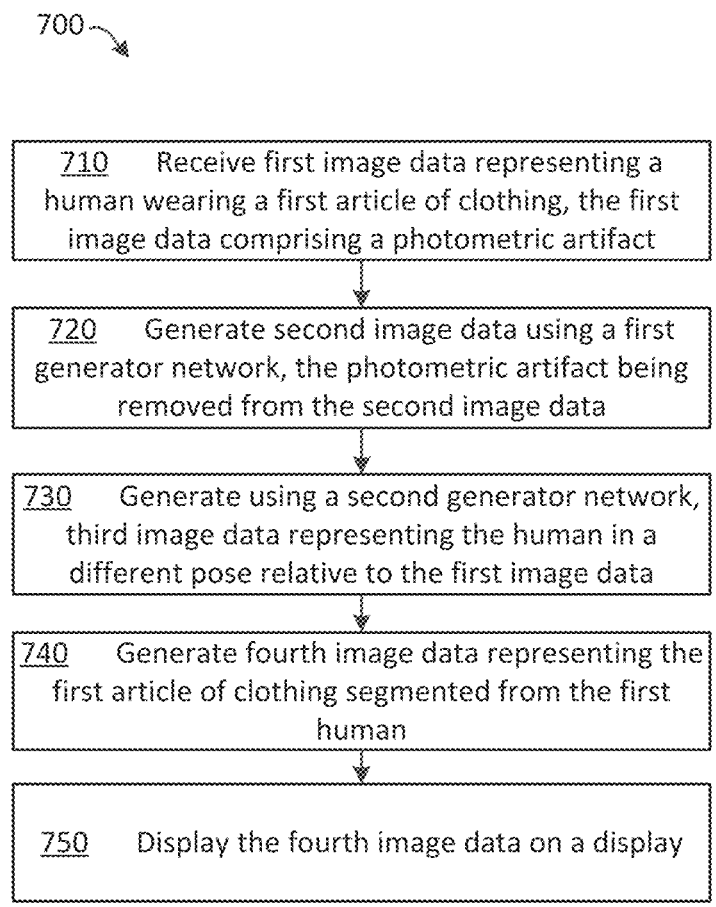
FIG. 7 is a flowchart describing an example process for catalog normalization and segmentation for fashion images, according to various aspects of the present disclosure.

FIG. 7 depicts a flow chart showing an example process 700 for providing catalog normalization and segmentation for fashion images, in accordance with various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 may begin at action 710, at which first image data representing a human wearing a first article of clothing may be received. The first image data may comprise at least one photometric artifact. In various examples, the first image data may be an image received from a third party seller depicting a garment being worn by a model. The image may have various defects such as low lighting, white imbalances, lens flare, etc.

Process 700 may continue from action 710 to action 720, at which second image data may be generated from the first image data using a generator network. In various examples, the generator network may be trained as part of a GAN (e.g., as described above in reference to FIG. 2). The second image data output by the first generator network may have removed the one or more photometric artifacts present in the first image data such that the second image data has been normalized for the relevant standards (e.g., for photographic quality standards associated with an online catalog, marketplace, and/or e-commerce service).

Process 700 may continue from action 720 to action 730, at which a second generator network may be used to generate third image data representing the human in a different pose relative to the pose of the human in the first (and second) image data. At action 730, the post of the human in the second image data may be determined. The second generator (trained as part of a second GAN, as described above in reference to FIG. 3) may be used to modify the pose of the human to generate the third image data, in which the human model's pose may conform to a standard pose (for which the second GAN network has been trained). For example, a common pose for a packshot image may be a frontal pose.

Process 700 may continue from action 730 to action 740, at which fourth image data may be generated from the third image data using a semantic segmentation network. The fourth image data may depict the subject article of clothing segmented from the model (e.g., the fourth image data may depict the subject article of clothing and not the model).

Process 700 may continue from action 740 to action 750, at which code may be generated (e.g., executable code) that, when executed by at least one processor, may be effective to cause the fourth image data to be displayed on a display. In various examples, prior to displaying the fourth image data, the fourth image data may be modified using an in-painting technique to generate synthetic pixels to replace any gaps or holes in the pixels representing the article of clothing resulting from occlusions in the original input image (e.g., the first image data received at action 710).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
receiving first image data representing a first human wearing a first article of clothing, wherein the first image data, when rendered on a display, comprises a first photometric artifact;
generating, using a first generator network, second image data from the first image data, wherein the first photometric artifact is removed from the second image data, when rendered on the display;
generating, by a second generator network using the second image data, third image data representing the first human in a different pose relative to the first image data;
generating, using the third image data, fourth image data representing the first article of clothing segmented from the first human; and
generating code that, when executed by at least one processor, is effective to cause the fourth image data to be displayed on the display.

2. The method of claim 1, further comprising training the first generator network using adversarial loss and perceptual loss to generate image data constrained by input images.

3. The method of claim 1, further comprising:
training the first generator network together with a discriminator network, wherein the discriminator network is trained using:
a first pair of image data comprising a first natural image with a second photometric artifact and an edited version of the first natural image, edited to remove the second photometric artifact; and
a second pair of image data comprising a second natural image with a third photometric artifact and a generated image generated by the first generator network to remove the third photometric artifact.

4. The method of claim 3, wherein the first pair of image data further comprises first ground truth data indicating that the edited version of the first natural image is classified as "real," and the second pair of image data further comprises second ground truth data indicating that the generated image is classified as "fake."

5. The method of claim 1, further comprising:
generating, using a pre-trained network, a first activation map at a first layer of the pre-trained network, the first activation map being generated in response to inputting the first image data into the pre-trained network;
generating, using the pre-trained network, a second activation map at the first layer of the pre-trained network, the second activation map generated in response to inputting the second image data into the pre-trained network; and
comparing the first activation map and the second activation map to determine a perceptual loss associated with the second image data.

6. The method of claim 5, further comprising:
back-propagating the perceptual loss; and
updating at least one parameter of the first generator network to minimize the perceptual loss.

7. The method of claim 1, further comprising:
determining, by a geometric transformation model, first data representing a first pose of the first human;
inputting the first data into the second generator network;
generating second pose data representing a symmetrically aligned pose of the first human; and
generating the second image data with the first human in the different pose using the second pose data.

8. The method of claim 1, wherein the first article of clothing, as represented in the fourth image data, is at least one of a different color, a different texture, or a different style relative to the first article of clothing as represented in the first image data.

9. The method of claim 1, further comprising:
determining a portion of the fourth image data corresponding to a portion of the first image data, wherein the portion of the first image data represents a portion of the first article of clothing that is occluded from view; and
generating modified fourth image data by applying an image in-painting technique to the portion of the fourth image data.

10. A system comprising:
at least one processor; and
at least one non-transitory, computer-readable memory storing instructions that, when executed by the at least one processor, are effective to:
receive first image data representing a first human wearing a first article of clothing, wherein the first image data, when rendered on a display, comprises a first photometric artifact;
generate, using a first generator network, second image data from the first image data, wherein the first photometric artifact is removed from the second image data, when rendered on the display;
generate, by a second generator network using the second image data, third image data representing the first human in a different pose relative to the first image data;
generate, using the third image data, fourth image data representing the first article of clothing segmented from the first human; and
generate code that, when executed by the at least one processor, is effective to cause the fourth image data to be displayed on the display.

11. The system of claim 10, wherein the at least one non-transitory computer-readable memory stores further instructions that, when executed by the at least one processor, are further effective to train the first generator network using adversarial loss and perceptual loss to generate image data constrained by input images.

12. The system of claim 10, wherein the at least one non-transitory computer-readable memory stores further instructions that, when executed by the at least one processor, are further effective to:
train the first generator network together with a discriminator network, wherein the discriminator network is trained using:
a first pair of image data comprising a first natural image with a second photometric artifact and an edited version of the first natural image, edited to remove the second photometric artifact; and
a second pair of image data comprising a second natural image with a third photometric artifact and a generated image generated by the first generator network to remove the third photometric artifact.

13. The system of claim 12, wherein the first pair of image data further comprises first ground truth data indicating that the edited version of the first natural image is classified as "real," and the second pair of image data further comprises second ground truth data indicating that the generated image is classified as "fake."

14. The system of claim 10, wherein the at least one non-transitory computer-readable memory stores further instructions that, when executed by the at least one processor, are further effective to:
generate, using a pre-trained network, a first activation map at a first layer of the pre-trained network, the first activation map being generated in response to inputting the first image data into the pre-trained network;
generate, using the pre-trained network, a second activation map at the first layer of the pre-trained network, the second activation map generated in response to inputting the second image data into the pre-trained network; and
compare the first activation map and the second activation map to determine a perceptual loss associated with the second image data.

15. The system of claim 14, wherein the at least one non-transitory computer-readable memory stores further instructions that, when executed by the at least one processor, are further effective to:
back propagate the perceptual loss; and
update at least one parameter of the first generator network to minimize the perceptual loss.

16. The system of claim 10, wherein the at least one non-transitory computer-readable memory stores further instructions that, when executed by the at least one processor, are further effective to:
determine, by a geometric transformation model, first data representing a first pose of the first human;
input the first data into the second generator network;
generate second pose data representing a symmetrically aligned pose of the first human; and
generate the second image data with the first human in the different pose using the second pose data.

17. The system of claim 10, wherein the first article of clothing, as represented in the fourth image data, is at least one of a different color, a different texture, or a different style relative to the first article of clothing as represented in the first image data.

18. A method comprising:
receiving first image data depicting a first human wearing a first article of clothing, wherein the first image data, when rendered on a display, comprises a first photometric artifact;
generating, using a first generator network, second image data from the first image data, wherein the first photometric artifact is removed from the second image data, when rendered on the display;
generating, using the second image data, third image data depicting the first article of clothing segmented from the first human; and
generating code that, when executed by at least one processor, is effective to cause the third image data to be displayed on the display.

19. The method of claim 18, further comprising:
training the first generator network together with a discriminator network, wherein the discriminator network is trained using:
a first pair of image data comprising a first natural image with a second photometric artifact and an edited version of the first natural image, edited to remove the second photometric artifact; and
a second pair of image data comprising a second natural image with a third photometric artifact and a generated image generated by the first generator network to remove the third photometric artifact.

20. The method of claim 18, further comprising:
generating, using a pre-trained network, a first activation map at a first layer of the pre-trained network, the first activation map being generated in response to inputting the first image data into the pre-trained network;

generating, using the pre-trained network, a second activation map at the first layer of the pre-trained network, the second activation map generated in response to inputting the second image data into the pre-trained network; and
comparing the first activation map and the second activation map to determine a perceptual loss associated with the second image data.

* * * * *